United States Patent
Richards et al.

(10) Patent No.: US 8,336,038 B2
(45) Date of Patent: Dec. 18, 2012

(54) SYSTEM AND METHOD FOR PARALLEL EXECUTION OF A PROGRAM

(75) Inventors: Andrew Richards, Edinburgh (GB); Andrew Cook, Edinburgh (GB); Colin Riley, Edinburgh (GB)

(73) Assignee: Codeplay Software Limited, Edinburgh (GB)

( * ) Notice: Subject to any disclaimer, the term of this patent is extended or adjusted under 35 U.S.C. 154(b) by 1097 days.

(21) Appl. No.: 12/161,130

(22) PCT Filed: Jan. 26, 2007

(86) PCT No.: PCT/GB2007/000286
§ 371 (c)(1), (2), (4) Date: Aug. 27, 2008

(87) PCT Pub. No.: WO2007/085855
PCT Pub. Date: Aug. 2, 2007

(65) Prior Publication Data
US 2010/0153937 A1 Jun. 17, 2010

(30) Foreign Application Priority Data
Jan. 26, 2006 (GB) .................................. 0601566.3

(51) Int. Cl.
*G06F 9/45* (2006.01)
(52) U.S. Cl. ........................................ 717/149; 717/140
(58) Field of Classification Search ........... 717/140–161
See application file for complete search history.

(56) References Cited

U.S. PATENT DOCUMENTS

| | | | |
|---|---|---|---|
| 5,812,852 A | 9/1998 | Poulsen et al. | |
| 5,852,734 A | 12/1998 | Komatsu et al. | |
| 5,857,105 A * | 1/1999 | Ayers et al. | 717/144 |
| 6,442,751 B1 * | 8/2002 | Cocchi et al. | 717/133 |
| 7,222,218 B2 * | 5/2007 | Dutt et al. | 711/125 |
| 7,254,806 B1 * | 8/2007 | Yates et al. | 717/136 |
| 7,346,902 B2 * | 3/2008 | Dutt et al. | 717/149 |
| 7,603,664 B2 * | 10/2009 | Dutt et al. | 717/153 |
| 7,765,532 B2 * | 7/2010 | Dutt et al. | 717/149 |
| 2004/0078538 A1 * | 4/2004 | Dutt et al. | 711/168 |
| 2004/0078779 A1 * | 4/2004 | Dutt et al. | 717/106 |
| 2004/0078780 A1 * | 4/2004 | Dutt et al. | 717/106 |
| 2004/0078785 A1 * | 4/2004 | Dutt et al. | 717/136 |

OTHER PUBLICATIONS

McKenzie, Scott, "Codeplay Sieve C++ System," 2006, Codeplay Software Limited.*
Richards, Andrew, "The Codeplay Sieve C++ Parallel Programming System," 2006, Codeplay Software Limited, p. 1-8.*
International Search Report.

(Continued)

*Primary Examiner* — Wei Zhen
*Assistant Examiner* — Qing Chen
(74) *Attorney, Agent, or Firm* — Moore & Van Allen PLLC; W. Kevin Ransom

(57) ABSTRACT

A computer system for executing a computer program on parallel processors, the system having a compiler for identifying within a computer program concurrency markers that indicate that code between them can be executed in parallel and should be executed with delayed side-effects; and an execution system that is operable to execute the code identified by the concurrency markers to generate a queue of side-effects and after execution of that code is completed, sequentially execute the queue of side-effects.

20 Claims, 8 Drawing Sheets

OTHER PUBLICATIONS

Bacon, D. F. et al., "Compiler transformations for high-performance computing", ACM Computing Surveys, New York, NY, US, vol. 26, No. 4, Dec. 1994, pp. 345-420, XP002246513, ISSN: 0360-0300.

Xiaoru Dai et al., "A General Compiler Framework for Speculative Optimizations Using Data Speculative Code Motion" Code Generation and Optimization, 2005, CGO 2005. International Symposium on San Jose, CA, USA Mar. 20-30, 2005, Piscataway, NJ, USA, IEEE, Mar. 20, 2005, pp. 280-290, XP010781649m ISBN: 0-7695-2298-X.

Hall, M. W. et al., "Interprocedural Compilation of Fortran D for Mind Distributed-Memory Machines" Proceedings of the Supercomputing Conference. Minneapolis, Nov. 16-20, 1992, Los Alamitos, IEEE Comp. Soc. Press, US, vol. Conf. 5, Nov. 16, 1992, pp. 522-534, XP000358017, ISBN: 0-8186-2630-5.

International Search Report, mailed on Apr. 24, 2007.

\* cited by examiner

SYSTEM AND METHOD FOR PARALLEL EXECUTION OF A PROGRAM

The present invention relates to a system and method for parallel execution of a computer program.

BACKGROUND OF THE INVENTION

U.S. Pat. No. 5,852,734 describes a parallel compiler for increasing the speed of, program execution by decomposing a loop onto a plurality of processors and executing them in parallel. First, a loop in a source program is located which is to be executed in parallel. This loop is then analyzed for data dependence. The result of the analysis is used for calculating data dependence vectors. Then all areas of the index executed in the loop are decomposed and assigned to a number of processors. Further, it is determined whether data needs to be transferred between processors. Based on the array index space, communication vectors are calculated. Data dependence vectors and communication vectors are ANDed to calculate communication dependence vectors. Then, the manner of communication of operands and loop execution are determined based on the values of communication dependence vectors.

A problem with the arrangement of U.S. Pat. No. 5,852,734, and indeed other known parallelization systems is that they are very difficult to de-bug. This is a significant practical barrier. This is because known systems are generally non-deterministic in nature. This means that some parts of the parallelized algorithm are dependent on other parts finishing first. For various reasons, such as random processor errors, the timing of parts of the program can be disrupted. This can cause the parallelized algorithm to fail. Because timing errors can be due to random events, tracking down this type of problem is extremely difficult. This means that system reliability cannot be guaranteed.

Furthermore, other known systems assume a single shared memory space. New architectures offer multiple memory spaces to increase execution performance. It is therefore essential to support multiple memory spaces within any high performance parallelization system, which claims to work on multiple hardware platforms.

SUMMARY OF THE INVENTION

According to the present invention, there is provided a parallelization system comprising a compiler, with means for identifying within a computer program concurrency markers that indicate that within the code between the markers any side-effects must be delayed, and an execution system, which ensures that, when executed, the code identified by the concurrency markers generates a queue of side-effects and after execution of that code is completed, sequentially executes the queue of side-effects. The execution system may be implemented in software, hardware, or a combination of both.

By using markers that indicate which code will have delayed side-effects and adapting a compiler to recognize these, there is provided a very simple, essentially deterministic technique for enabling the compiler to automatically parallelize the software. This simplifies de-bugging and so improves reliability. Also, because the concurrency instructions divide the code into substantially independent blocks, the program can be run on a wide range of different systems. Specifically, the concurrency instructions divide up data into blocks that can be stored in different memory spaces. Also, because the concurrency blocks can be auto-parallelized, the system is readily scalable in terms of both number of processors and memory spaces.

The compiler may be operable to identify within the concurrency markers, one or more split markers that indicate where the program may be split optionally to form separate program fragments that may be executed in parallel. The execution system executes the fragments of code concurrently and generates a queue of side-effects and, after execution of that code is completed, sequentially executes the queue of side-effects.

The compiler may be operable to recognise within the concurrency markers one or more special variables, which can optionally be split into many variables for parallel execution and a merge instruction indicative of how the outputs of the many variables can be merged into a single result. The execution system may be operable to direct the split variables to one or more different processors for execution; receive the update versions of each of the variables; merge these and store them in the main memory.

In one embodiment, the invention constitutes a parallelization system for parallelizing and subsequently executing computer programs, the system being configured to: identify within the program concurrency markers that indicate that code between them should be executed with delayed side-effects; determine whether the code between the markers can be parallelized; send the code to one or more of a plurality of processors for execution; execute the code identified by the concurrency markers on the one or more processors to generate a queue of side-effects, and after execution of that code is completed, sequentially execute the queue of side-effects.

According to another aspect of the invention, there is provided a method for executing a computer program comprising: identifying within the program concurrency markers that indicate that code between them should be executed with delayed side-effects; executing the code identified by the concurrency markers to generate a queue of side-effects, and after execution of that code is completed, sequentially executing the queue of side-effects. The method may further involve identifying, within the marked code, fragments that can be run in parallel.

According to yet another aspect of the invention, there is provided a computer program, preferably on a data carrier or a computer readable medium, the computer program including concurrency markers that indicate that code between them, concurrency regions, should be executed with delayed side-effects.

Included within the concurrency markers may be one or more marked splittable objects indicative of where a variable is splittable into local variables for concurrent execution and a merge instruction indicative of how the local variables can be merged back into a single variable.

Preferably, multiple concurrency regions are defined, these being executable in parallel.

One or more concurrency regions may be nested within an outer concurrency region.

BRIEF DESCRIPTION OF THE DRAWINGS

Various aspects of the present invention will now be described by way of example only and with reference to the accompanying drawings, of which.

DETAILS OF THE INVENTION

Figure 1:
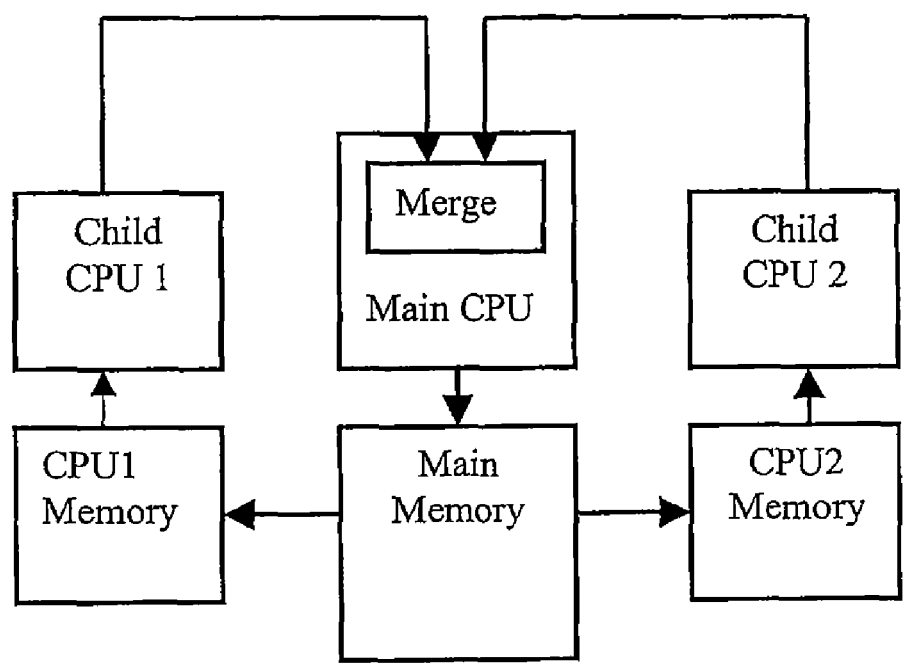
FIG. 1 is a block diagram of a parallelization system.

The present invention provides a parallelisation system that consists of a compiler that parallelizes a program into separate code fragments and an execution system that executes the code fragments in parallel. The invention allows computer programs to be parallelized in a manner that is portable, scalable and reliable. This is achieved using a specific software code structure and a compiler, i.e. a program that translates programmer source code into machine-executable code, which is operable to recognize this structure and make parallelization decisions based on it. Most software can be adapted to conform to the requirements of the invention, although software written in programming languages such as C and C++ is particularly well suited to this.

To adapt software to comply with the present invention, concurrency regions have to be marked within the program that is to be parallelized. A concurrency region is a section of source-code that the programmer wants to be executed in parallel. Marking concurrency regions can be carried out at the time the software is being written, or later in the event that the software has subsequently to be adapted for parallelization. Concurrency regions have two purposes: The first is to indicate to the compiler where it is desired to run code in parallel. The second is to mark blocks of code in which side-effects should be delayed. By side-effects, it is meant modifications to any part of the program state that is defined outside a sieve block. This includes memory writes, modifications of hardware state and execution of functions defined outside the sieve system. The execution of the marked blocks is separated into two parts. The first part, the sieve computation, creates and stores a queue of side-effects, but excludes the application of the side effects, and the second part, the side-effect computation, makes the modifications to the program state as stored in the side-effects queue sequentially. This allows the sieve computation to be parallelized.

In a system with multiple memory spaces the execution may be split into three parts; the first of these, data loading, computes the data necessary to perform the sieve computation and communicates it to the memory space chosen for that execution. The second stage, data processing, processes the loaded data on an execution unit and produces a queue of side-effects. These side-effects are written back to the parent memory in the third phase, write back. On some architectures the data loading and data processing phases may be interleaved. This may be achieved by suspending a data processing task to a work queue while waiting for a memory load to complete, and continuing with other computations retrieved from this work queue marked as being ready. Loading of necessary data for the suspended task is performed in the background. When loading has completed the suspended task is ready to be resumed by a free execution unit.

In a concurrency region, there are typically local variables and external variables. The local variables are defined within the concurrency region. The external variables are defined outside the concurrency region. Concurrency region side-effects are modifications to external variables. Concurrency regions delay those side-effects until after program control has left the concurrency region. These delayed side-effects can be divided into queued side-effects, which may include memory writes and function calls, and other side-effects, such as merge operations.

The concurrency regions are defined by the programmer using a sieve. This is a section of program that is defined by the programmer that has its side effects delayed. A sieve is recognizable by the compiler as meaning that all memory writes and other side-effects are to be delayed until the end of the sieve (effectively a sieve filters out side-effects). Because the meaning of the sieve is clearly defined as is the timing and order in which work is done, programs that use it are deterministic. The sieve can take any suitable syntactic form, for example: sieve { ... }, thereby to define a sieve block. This is a way of describing a sieve in source code. The code between the brackets is within a single concurrency region. Hence, each sieve block is a concurrency region. By delaying side-effects within a sieve block a sieve ensures that variables inside cannot depend on modifications to variables outside the block. A sieve block can be seen as a function whose inputs are the whole of available memory and whose outputs are a queue of side-effects. As noted before, the sieve computation creates a queue of side-effects, but excludes the execution of the side effects.

Sieve blocks are extracted into functions or procedures in which the flow of data and control are clearly defined. These extracted functions are independent of all other code blocks and therefore can be compiled separately. The ability for these independent, deterministic code blocks to be compiled separately means that each sieve block can be compiled to a different target architecture, resulting in maximum cross platform compatibility.

In a variation of the simple sieve described, two or more sieves can be nested. In this case, writes to local memory (and other local side-effects) inside the enclosing sieve are executed on exiting the nested sieve. External writes and other side-effects are appended to the appropriate queues for the enclosing sieve. When nesting sieves the absolute depth of nesting of a particular sieve measured downwards from non-sieve code is called its sieve depth. The sieve level of a particular sieve, or construct declared inside that sieve, is the relative level measured upwards from the current sieve.

Because pointers can exist inside sieves that point to data outside the particular sieve there are provided several different pointer types for use inside sieves. Immediate pointers are those that point to data within the current sieve block. Immediate pointers have the same meaning as normal pointers outside a sieve in that data pointed to by an immediate pointer can be altered immediately. Global pointers are those that point to data at the top level, which is not inside any sieve. Outside sieves global pointers are normal pointers and act the same as immediate pointers within a sieve block. Inside a sieve block any writes to global pointer must be delayed until after all current sieve blocks have been exited. Delayed pointers are those that point to an outer level of sieve nesting. Delayed pointers are annotated with the level of sieve that they point to; these levels are relative to the current level so if a new sieve block is started the level of existing delayed pointers will be increased by one. Writes to delayed pointers are delayed until the level of sieve nesting that they point to. Immediate, global and delayed writes are marked in the source code as separate types to allow a programmer to easily identify type mismatch errors.

In another variation of the basic concept, explicit concurrency can be introduced by composing sieves in parallel. It is always safe to execute independent sieve computations concurrently. The sieve computations are executed in parallel, generating queues of side-effects. Subsequently, the side-effects are executed sequentially. The side-effects from the first sieve computation are executed before those of the second sieve computation. In general, the side-effects from the i-th sieve parallel composed computation are executed before those of the (i+1)-th sieve parallel composed computation. Normally, the side-effects will be applied at the exit of the relevant sieve block. However, a programmer may want to store the side-effects queue and apply them later.

Further concurrency can be obtained inside sieve blocks by using splittable objects.

Splittable objects can be split across several child processors, and subsequently be merged back into a single object on the parent or designated control processor. This amounts to removing a dependency between the value of a splittable object before and after it is modified. To use splittable objects, the programmer has to define a split/merge operation on a class. Typically, this will be done using split/merge templates that are provided for specific functions, for example summing the contents of an array.

To allow a split/merge operation to be implemented, the programmer has to determine methods that allow operations on the object to be performed concurrently on several processors and then merged into one result at the end of the sieve block. The programmer has to specify an onsplit operation, which is invoked on each copy of the splittable object. The onsplit operation can optionally take a count of the number of change points that occur before the split point in the control flow, where a change point is defined as being the point at which a splittable object is modified. This allows, for instance, loops to be parallelized. In this case, the change point count is the number of iterations round the loop. For split operations, the programmer can specify the merge operation, which defines how to recombine several copies of a splittable object after the child processes terminate. For example, the merge operation could merely be a command to sum all of the outcomes of each of the child processes.

An example of using sieves with splittable objects to obtain greater concurrency is splitting up a loop, which sometimes updates an accumulator and also performs arbitrary side-effects inside the loop, where the accumulator is an object for which the only applicable operation is addition. The loop iterator and the accumulator can both be defined as splittable objects. The loop is split up into fragments, which are executed in parallel. Each fragment has its own copy of the iterator and the accumulator. Each fragment takes the initial value of the accumulator. Providing that the only operation on the accumulator is incrementing it, then the accumulators resulting from executing the sieve computation for each fragment can be safely merged after the parallel computation has finished, simply by adding them together. The accumulators are merged after the sieve block when, the queued side-effects are executed.

The compiler can perform a dependency analysis on the code in a sieve block to determine parallelisation. Techniques for doing dependency analysis are known and so will not be described in detail. Because side-effects are delayed, there can be no write-before-read dependencies on data defined outside the sieve block. This simplifies dependency analysis. Also, if there is a dependency discovered on a splittable object, then the dependency can be removed by using the object's split and merge methods. It is therefore possible to analyse a sieve block and find points in which it is possible to remove all dependencies. These will be referred to as potential split points.

Potential split points can occur in loops allowing separate iterations to be run in parallel, or outside loops allowing different sections of code to be run in parallel. Potential split points can also occur inside conditional branches. In this case the continuation of the branch in which the split point occurs can be executed speculatively before knowing which branch is actually going to be taken. This means that the execution system executes a code fragment before a decision has been taken as to whether the code fragment should be executed and applying the side-effects once the decision has been taken and is positive.

Functions/procedures may be called from within a sieve block but due to the necessity of collecting side-effects these procedures may be marked in the code and compiled differently from normal functions. Two different types of functions may be marked for use inside a sieve block. Sieve functions are functions that, due to side-effects, would have a different meaning were they compiled for use outside of a sieve block. Use of sieve functions will be restricted to within sieve blocks because the generated side-effects have no relevance outside of a sieve block. Immediate functions are those that, due to lack of side-effects, have the same meaning inside or outside a sieve block. The definition of an immediate function is restricted to ensure that it does not write to anything which may be outside any enclosing sieve. This ensures that it generates no side-effects and may be safely compiled for use anywhere either within or outside of a sieve block.

Once the programmer has marked up the software, it can be parallelized using the compiler in which the invention is embodied. This compiler is operable to recognize the sieves and split/merge operations and re-order the code in a deterministic way by removing dependencies. Individual sections of code are converted for processing by separate processors. The compiler also separates the memory spaces that are available, for example as shown in FIG. 1. This has a single global memory that is associated with the main system processor. This is used for storing normal data. Separate memory spaces are defined for each of the local or child processors that are involved in parallelization. These are for storing local information defined within the sieves. When a sieve is completed on one of the child processors, the delayed store data generated and stored is copied from the local memory, merged with the corresponding data from the other sieves by the main CPU and subsequently stored in the main CPU memory.

Figure 2:
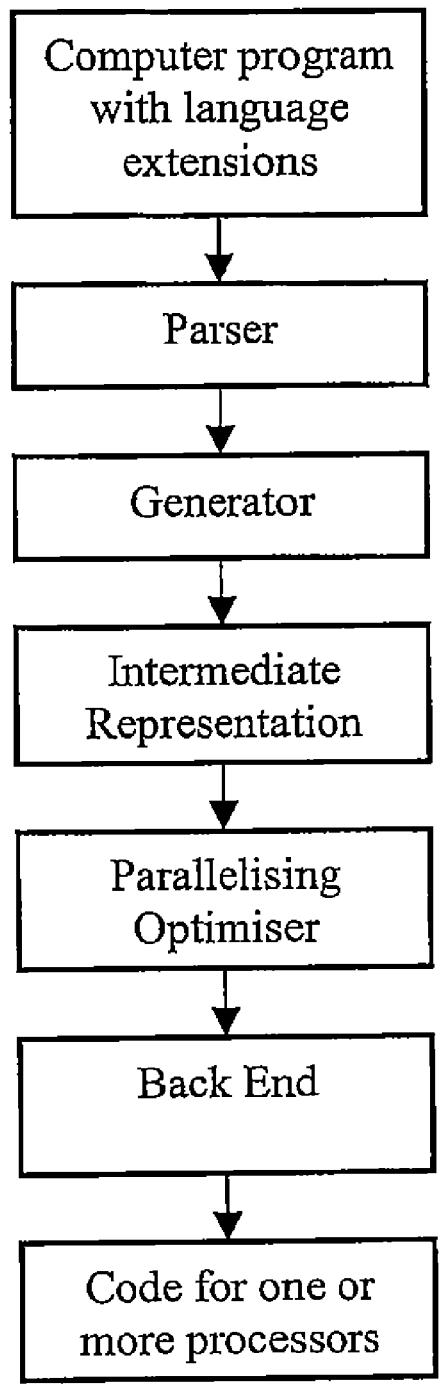
FIG. 2 is a flow diagram of a compilation process.

FIG. 2 shows the steps that are taken by the compiler in accordance with the present invention. This involves receiving firstly the computer program that has marked concurrency regions, i.e. sieve blocks and optionally split/merge operations. The program is passed to a parser, which is extended to handle concurrency regions. The output of the parser is passed to a translator that converts the original program language into a format suitable for compilation. In particular, the translator outputs an intermediate representation (IR) that is extended with instructions for managing concurrency and delayed side-effects.

In the intermediate representation, a distinction is made between immediate and delayed variables and memory locations. A variable or memory location is immediate if it is declared inside the current sieve. Writes to an immediate variable happen immediately inside the sieve in which the variable is declared. A variable or memory location is delayed if it is declared outside a sieve. Writes to a delayed variable are delayed until the sieve exits. Reads always happen immediately, though the IR may distinguish between external reads from delayed variables and internal reads from immediate variables. Change points and splittable objects are marked in the IR. The parser contains a system for distinguishing whether pointers refer to memory locations within a sieve block or outside it. The intermediate representation is passed to a parallelizing optimizer that computes how best to split up the program so that the parts can be run in parallel on the target architecture.

Figure 3:
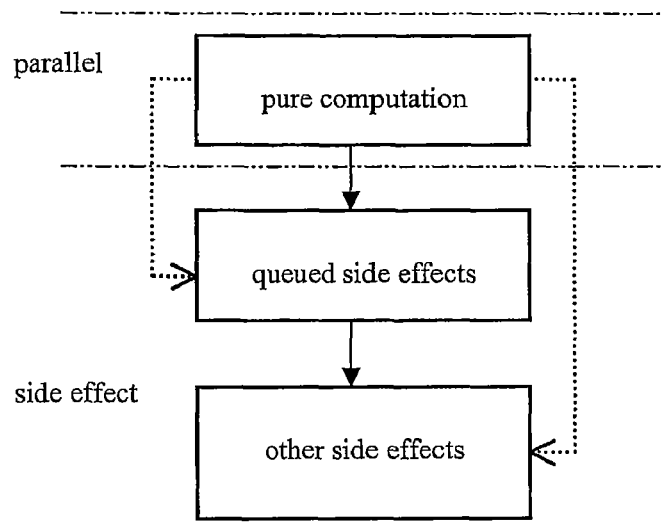
FIG. 3 is a schematic illustration of a sieve for use in the process of FIG. 2.

The compiler is operable to identify sieves within the program code and ensure that these are executed correctly according to the specification of sieves. This is illustrated in FIG. 3. As noted previously, a sieve is a concurrency region that separates sieve computation from side-effect computation. Within the sieve construct, first the sieve computation is executed, generating a queue of side-effects. Then, the queue of side-effects is executed sequentially. In FIG. 3, the solid black lines indicate control flow, the dotted lines indicate the data flow and the dashed lines delimit the parallel computation. Before execution, the queue of side-effects can be optimized, for speed and size, by the compiler or the execution system. This can be done by, for example, removing redundant writes to the same address or reordering independent side-effects.

Figure 4:
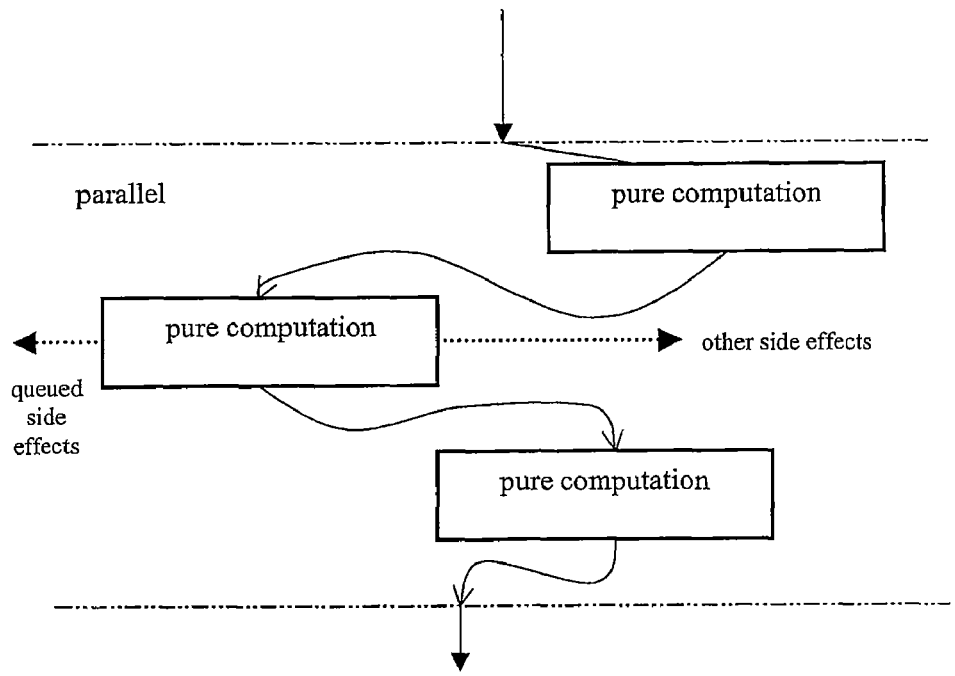
FIG. 4 is a schematic illustration showing implicit concurrency in sieve computations.

Sieve computations are amenable to automatic parallelization. Separating sieve computation from side-effect computation introduces implicit concurrency, as shown in FIG. 4. As before, the solid black lines indicate control flow, the dotted lines indicate the data flow and the dashed lines delimit the parallel computation. Any collection of sub-computations of a sieve computation can always be executed in parallel unless one depends on the result of another. Hence, the optimizer is operable to conduct a dependency analysis in order to perform automatic parallelization on the sieve computation and determine potential split-points. Write-before-read dependencies on delayed variables are removed, as any writes to delayed variables are delayed. Furthermore, dependencies on splittable objects are removed, as such dependencies can be replaced by split and merge operations.

Figure 5:
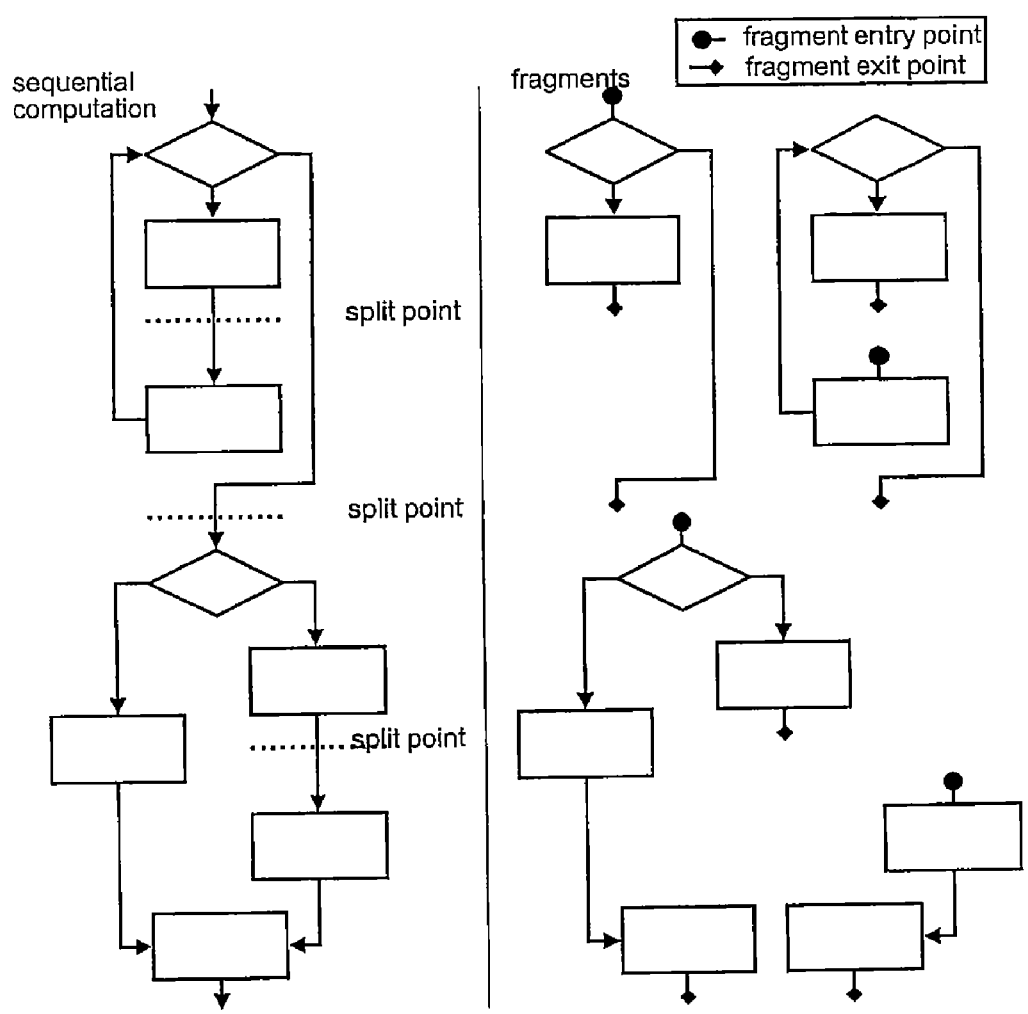
FIG. 5 shows how a sequential computation is split into fragments.

Once the potential split-points have been found, the intermediate representation is split up into fragments to be executed in parallel, as shown in FIG. 5. Each fragment has a start point, which must be a potential split point, and one or more exit points, which must also be potential split points. Exactly how the intermediate representation is decomposed into fragments may be determined by characteristics of the target architecture or independently of the target based only on the characteristics of the intermediate representation itself. The intermediate representation may either be altered to allow control flow to enter and exit at arbitrary potential split points, as shown in FIG. 6.

Figure 6:
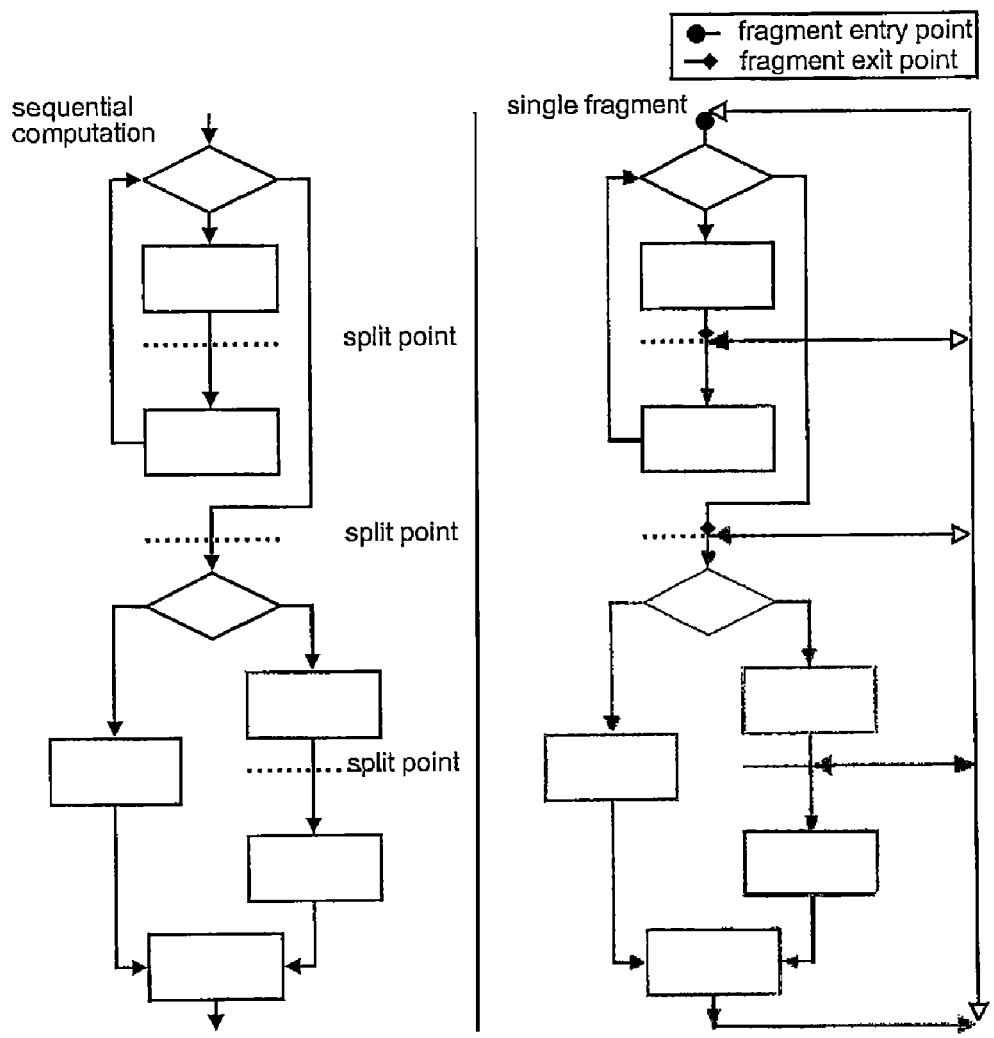
FIG. 6 shows control flow jumping in and out of a sieve block for executing a fragment.

FIG. 6 shows the conceptual structure of the intermediate representation; in reality setup and setdown stages also have to be separated out to ensure that all the local variables are initialised to the correct values and removed correctly. FIG. 5 shows how the intermediate representation may be decomposed into completely separate fragments while FIG. 6 shows that one intermediate representation may be used and parameterised to allow execution of the part corresponding to a single fragment or multiple sequential fragments by entering and exiting at different points.

The fragments are compiled independently of one another. Each fragment takes as input the change counts of any splittable objects. An onsplit operation is performed by each child processor on each splittable object before the child processor executes the main body of a fragment. On exiting a fragment, the exit point and change counts are returned to the parent processor, which manages and controls the fragments. The fragments are sent to the child processors along with appropriate splittable object parameters.

These parameters to a fragment may be obtained through a guessing strategy embedded in the execution system. Guessing strategies may encompass the start points and end points of a fragment and the values of any splittable objects on entry to the fragment. Guessing strategies may need to be altered to suit the individual sieve block depending on its structure and the algorithm. A typical guessing strategy is to execute a fragment until the change count for an iterator has been incremented by a fixed number n. Then each separate processor core can be given a guessed starting iterator value that increases by n for each new processor core.

Figure 7:
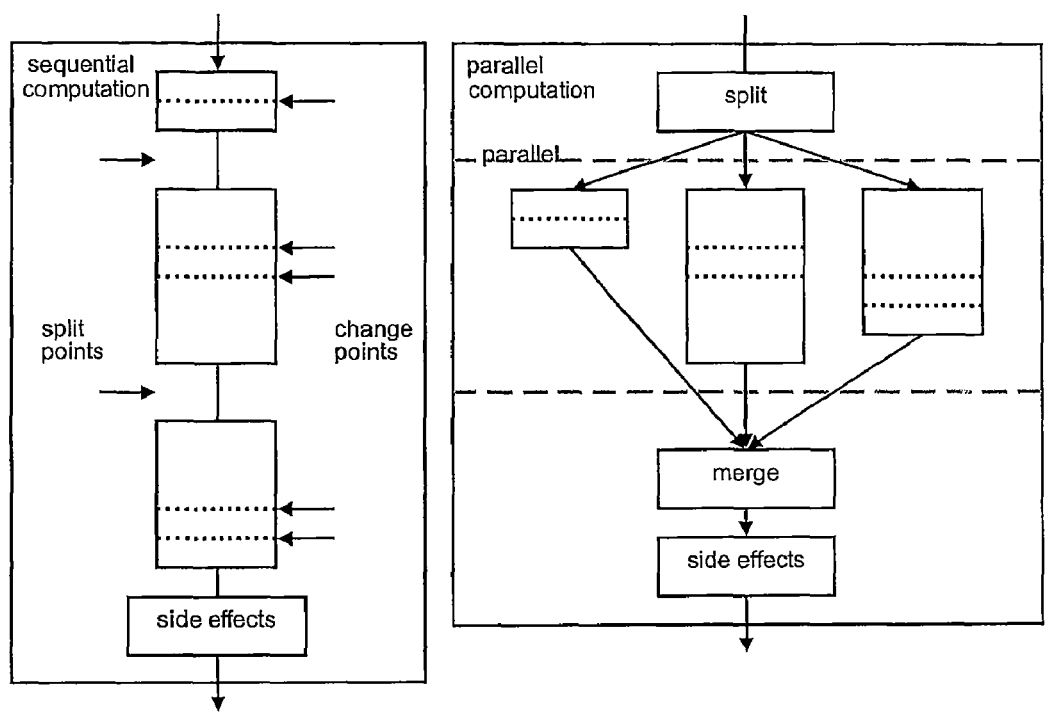
FIG. 7 is a schematic illustration of concurrency with objects that can be split.

As the fragments terminate, it is determined which execution path is being taken. Any dead branches resulting from speculative execution or bad guessing are discarded. After a valid path has been followed through the sieve the splittable objects are merged back onto the parent processor, as shown in FIG. 7. Finally any side-effects are performed in the correct order.

Figure 8:
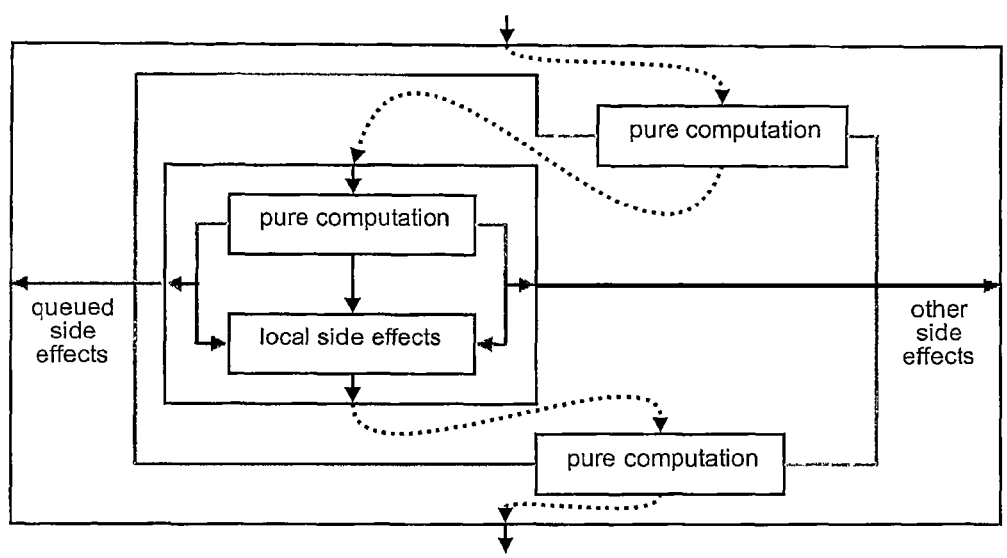
FIG. 8 is a schematic illustration of nested sieves.
Figure 9:
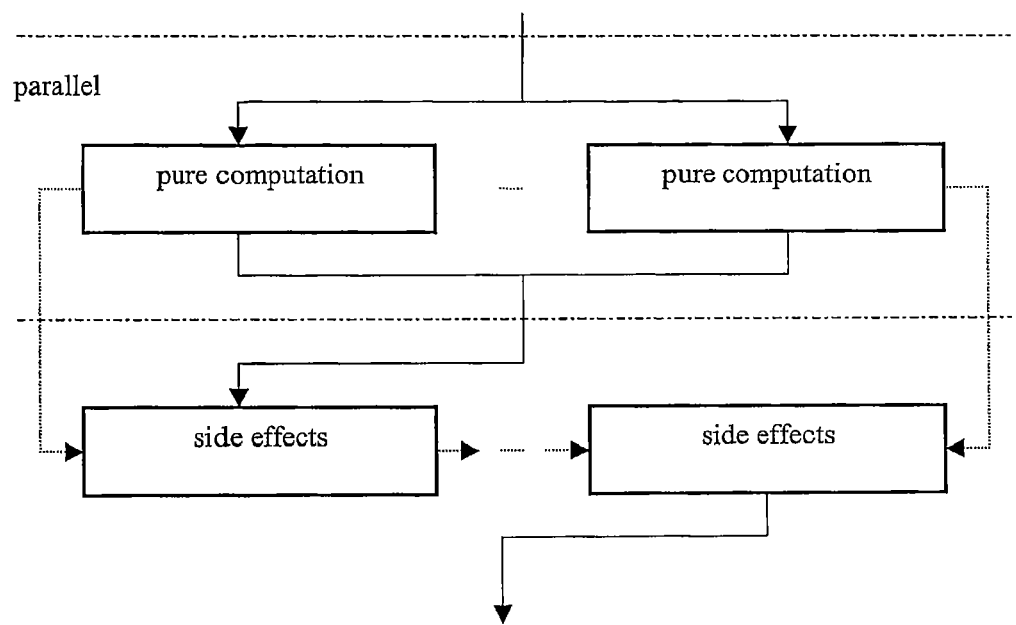
FIG. 9 is a schematic illustration of a plurality of parallel sieves.

As mentioned before, sieves can be nested, as shown in FIG. 8. In this case, writes to local memory inside the enclosing sieve and other local side-effects are executed on exiting the nested sieve. External queued side effects and other side-effects are appended to the appropriate queues for the enclosing sieve. In another variation of the basic concept, explicit concurrency can be introduced by composing sieves in parallel. This is shown in FIG. 9. It is always safe to execute independent sieve computations concurrently. The sieve computations are executed in parallel, generating queues of side-effects. Subsequently, the side-effects are executed sequentially. The side-effects from the first sieve are executed before those of the second sieve. In general, the side-effects from the i-th sieve are executed before those of the (i+1)-th sieve.

At some points in the execution of a fragment it may possible to save out the entire state of the fragment to a work queue and continue with the execution of a different fragment. This allows several different types of parallelism. For example: by saving out the state of the fragment on one processor and sending it to another processor to continue execution, a pipeline can be created. Or, by saving out the state of a fragment to a work queue when a slow operation is required, a memory load for example, and then continuing that fragment when the slow operation has completed, it is possible to achieve parallel execution even when waiting for slow operations to complete. When one fragment depends on results from one or more previous fragments, it is possible to save out the results from the previous fragments into a work queue and then execute the fragment that requires these results when all of the results are available.

The present invention provides a parallelization system and process for handling scalable software that is easy to use. This is done by using sieves, splits and merges to remove dependencies. The sieves separate out sieve computation from side-effect computation including external writes, reducing the process of automatic parallelization to a local dependency analysis. This means that independent computations can be safely executed in parallel. Splittable objects in conjunction with sieves can improve the results of dependency analysis by converting dependencies across change points into split and merge operations.

To utilize the system the programmer marks within the source software the regions that can be parallelized, the objects that are splittable and optionally the places where they want the program to be split. This means that a programmer can quickly transform software, for example conventional non-scalable C/C++ software into scalable parallel C/C++ software. The invention is adaptable to a wide range of hardware and is ideal for multi-core processors and scalable/dynamic hardware such as FPGAs.

A skilled person will appreciate that variations of the disclosed arrangements are possible without departing from the invention. For example, although described primarily with reference to a software implementation, it will be appreciated that the invention could be implemented in hardware. Also, whilst the invention is described with reference to a parallelization scheme, it will be appreciated that the compiler in which the invention is embodied could be used to run a program on a single processor. Accordingly the above description of the specific embodiment is made by way of example only and not for the purposes of limitation. It will be clear to the skilled person that minor modifications may be made without significant changes to the operation described.

The invention claimed is:

1. A parallelization system for a computer program comprising:
   a compiler comprising a computing processor device configured for identifying within the computer program, execution regions in which computer program code should be executed with delayed side-effects, wherein at least one of the execution regions is defined by concurrency markers indicating that the computer program code located between the concurrency markers should be executed with delayed side-effects; and
   an execution system comprising a computing processor device configured for executing the computer program code in the execution regions located between the concurrency markers identified by the compiler to generate code to store a queue of side-effects for later execution, and after execution of the computer program code in the execution regions located between the concurrency markers is completed, sequentially executing the queue of side-effects.

2. A parallelization system as claimed in claim 1, wherein the compiler is operable to identify within the concurrency markers, one or more marked splittable objects indicative of where a variable is splittable into local variables for concurrent execution and a merge instruction indicative of how the local variables can be merged back into a single variable.

3. A parallelization system as claimed in claim 1, wherein the compiler is operable to determine within the concurrency markers points where it is possible to split the code into fragments.

4. A parallelization system as claimed in claim 3, wherein the execution system is operable to send code fragments to different processors, each processor using shared or local memory spaces or a combination of both.

5. A parallelization system as claimed in claim 3, wherein the execution system is operable to save the state of code fragments on one processor into a work queue and reload the state of the code fragments into another processor when all input data is ready.

6. A parallelization system as claimed in claim 3, wherein the execution system is operable to speculatively execute code fragments using one or more guessing strategies.

7. A parallelization system as claimed in claim 1, wherein the computer program code located between the concurrency markers is defined as a concurrency region, and wherein two or more concurrency regions are nested.

8. A parallelization system as claimed in claim 1, wherein the computer program code located between the concurrency markers is defined as a concurrency region, and wherein a plurality of independent concurrency regions is defined, these being executable in parallel.

9. A compiler for use in a parallelization system, wherein the compiler comprises a computing processor device for identifying within a computer program code, execution regions in which the computer program code should be executed with delayed side-effects, wherein at least one of the execution regions is defined by concurrency markers indicating that the computer program code located between the concurrency markers should be executed with delayed side-effects, such that an execution system in the parallelization system may execute the computer program code in the execution regions located between the concurrency markers identified by the compiler to generate code to store a queue of side-effects for later execution, and after execution of the computer program code in the execution regions located between the concurrency markers is completed, sequentially execute the queue of side-effects.

10. An execution system adapted for use in a parallelization system, wherein the parallelization system comprises a compiler for identifying within a computer program code, execution regions in which the computer program code should be executed with delayed side-effects, wherein at least one of the execution regions is defined by concurrency markers indicating that the computer program code located between the concurrency markers should be executed with delayed side-effects, such that said execution system, comprising a computing processor device, may execute the computer program code in the execution regions located between the concurrency markers identified by the compiler to generate code to store a queue of side-effects for later execution, and after execution of the computer program code in the execution regions located between the concurrency markers is completed, sequentially execute the queue of side-effects.

11. An execution system as claimed in claim 10 that is operable to execute split and merge operations where the split operation indicates where a variable is splittable into variables for concurrent execution and the merge operation indicates where the variables can be merged back into a single variable.

12. An execution system as claimed in claim 10 that is operable to save the state of code fragments on one processor into a work queue and reload the state of the code fragments into another processor when all input data is ready.

13. A system for executing a computer program, the system comprising a computing processor device, wherein said computing processor device is configured to:
   identify within the computer program, execution regions in which computer program code should be executed with delayed side-effects, wherein at least one of the execution regions is defined by concurrency markers indicating that the computer program code located between the concurrency markers should be executed with delayed side-effects; and
   execute the computer program code in the identified execution regions located between the concurrency markers to generate code to store a queue of side-effects for later execution, and after execution of the computer program code in the identified execution regions located between the concurrency markers is completed, sequentially execute the queue of side-effects.

14. A system as claimed in claim 13 configured to identify within the concurrency markers, one or more splittable objects indicative of where a variable is splittable into local variables for concurrent execution and a merge instruction indicative of how the local variables can be merged back into a single variable.

15. A computer-implemented method for executing a selected computer program comprising:
   providing computer program code stored on a non-transitory computer-readable medium, said computer program code specifically configured to cause one or more computing processor devices to perform the following operations when executing the computer program code:
   identifying within the computer program code, execution regions in which the computer program code should be executed with delayed side-effects, wherein at least one of the execution regions is defined by concurrency markers indicating that the computer program code located between the concurrency markers should be executed with delayed side-effects; and
   executing the computer program code in the identified execution regions located between the concurrency markers to generate code to store a queue of side-effects for later execution, and after execution of the computer program code in the identified execution regions located between the concurrency markers is completed, sequentially executing the queue of side-effects.

16. A computer program stored on a non-transitory computer readable medium, the computer program having at least one execution region in which computer program code should be executed with delayed side-effects, wherein the at least one execution region is defined by concurrency markers indicating that the computer program code located between the concurrency markers should be executed with delayed side-effects, wherein an execution system may execute the computer program code in the at least one execution region located between the concurrency markers to generate code to store a queue of side-effects for later execution, and after execution of the computer program code in the at least one execution region located between the concurrency markers is completed, sequentially execute the queue of side-effects.

17. A computer program as claimed in claim 16 that includes within the concurrency markers one or more marked splittable objects indicative of where a variable is splittable into local variables for concurrent execution and a merge instruction indicative of how the local variables can be merged back into a single variable.

18. A computer program as claimed in claim 16, wherein multiple concurrency regions are defined.

19. A computer program as claimed in claim 18, wherein one or more concurrency regions are nested within an outer concurrency region.

20. A computer program as claimed in claim 19, wherein the one or more concurrency regions are independent and executable in parallel.

* * * * *